United States Patent [19]

Ueda

[11] Patent Number: 4,837,630
[45] Date of Patent: Jun. 6, 1989

[54] SOLID-STATE IMAGING APPARATUS WITH A PLURALITY OF CCD STORAGE SECTIONS

[75] Inventor: Kazuhiko Ueda, Yokohama, Japan

[73] Assignee: Victor Company of Japan, Ltd., Japan

[21] Appl. No.: 88,728

[22] Filed: Aug. 21, 1987

[30] Foreign Application Priority Data

Aug. 22, 1986 [JP] Japan .................................. 61-196933

[51] Int. Cl.$^4$ .............................................. H04N 3/14
[52] U.S. Cl. ............................ 358/213.26; 358/213.29
[58] Field of Search ....................... 358/213.26, 213.23, 358/213.27, 213.29, 909

[56] References Cited

U.S. PATENT DOCUMENTS

| | | | |
|---|---|---|---|
| 4,336,556 | 6/1982 | Sekine et al. | 358/213.26 |
| 4,472,741 | 9/1984 | Takatsu et al. | 358/909 |
| 4,635,122 | 1/1987 | Kato et al. | 358/213.26 |
| 4,686,573 | 8/1987 | Murayama et al. | 358/213.29 |

FOREIGN PATENT DOCUMENTS

| | | | |
|---|---|---|---|
| 3340338 | 5/1984 | Fed. Rep. of Germany . | |
| 58-56458 | 4/1983 | Japan . | |
| 58-97971 | 6/1983 | Japan . | |
| 59-62275 | 4/1984 | Japan . | |
| 59-122085 | 7/1984 | Japan | 358/213.19 |

OTHER PUBLICATIONS

European Search Report, Japanese patent abstract, vol. 8, No. 167, Aug. 2, 1984.
Japanese Patent abstract, vol. 7, No. 111, May 14, 1983.

*Primary Examiner*—Jin F. Ng
*Assistant Examiner*—Stephen Brinich
*Attorney, Agent, or Firm*—Lowe, Price, Leblanc, Becker & Shur

[57] ABSTRACT

An image pickup section includes an interline transfer CCD and a color filter arrangement having a period of two picture elements in horizontal and vertical directions. The image pickup section generates charges in accordance with incident lights. A storage section includes first and second CCDs. A switch arrangement selectively transfers the charges from the image pickup section to either of the first and second CCDs in the storage section. A readout section includes at least one CCD and reads out the charges from the storage section. During a vertical blanking period, picture element signals corresponding to odd lines are read out from the image pickup section and are transferred to the first CCD in the storage section, and then picture element signals corresponding to even lines are read out from the image pickup section and are transferred to the second CCD in the storage section. During a horizontal blanking period after the vertical blanking period, the readout section independently reads out the picture element signals from the first and second CCDs in the storage section.

4 Claims, 9 Drawing Sheets

SOLID-STATE IMAGING APPARATUS WITH A PLURALITY OF CCD STORAGE SECTIONS

BACKGROUND OF THE INVENTION

1. Field of the Invention

This invention relates to a solid-state imaging apparatus using a CCD (charge-coupled device) image sensor.

2. Description of the Prior Art

In some solid-state image sensors using interline transfer CCDs, signal charges corresponding to two picture lines are simultaneously read out to improve picture quality. Such an image sensor tends to have an inadequate sensitivity.

Japanese published unexamined patent application No. 59-62275 discloses a method of driving a solid-state imaging apparatus using interline transfer CCDs of the two-line simultaneously readable type. In this method, an electrical process removes smear components from picture signals.

Japanese published unexamined utility model application No. 58-56458 discloses a solid-state color imaging apparatus including interline transfer CCDs and horizontal CCD shift registers. Signal charges of a first color are transferred from the interline CCDs in common to one of the horizontal CCD shift registers. Signal charges of a second color are transferred from the interline CCDs in common to another horizontal CCD shift register.

SUMMARY OF THE INVENTION

It is an object of this invention to provide a sensitive solid-state imaging apparatus.

It is another object of this invention to provide a solid-state imaging apparatus enabling a high picture quality.

In a first solid-state imaging apparatus of this invention, an image pickup section includes an interline transfer CCD and a color filter arrangement having a period of two picture elements in horizontal and vertical directions. The image pickup section generates charges in accordance with incident lights. A storage section includes first and second CCDs. A switch arrangement selectively transfers the charges from the image pickup section to either of the first and second CCDs in the storage section. A readout section includes at least one CCD and reads out the charges from the storage section. During a vertical blanking period, picture element signals corresponding to odd lines are read out from the image pickup section and are transferred to the first CCD in the storage section, and then picture element signals corresponding to even lines are read out from the image pickup section and are transferred to the second CCD in the storage section. During a horizontal blanking period after the vertical blanking period, the readout section independently reads out the picture element signals from the first and second CCDs in the storage section.

In a second solid-state imaging apparatus of this invention, an image sensor includes photosensitive elements and an interline transfer CCD. The photosensitive elements generate charges in accordance with incident lights. The interline transfer CCD stores the charges generated by the photosensitive elements. The charges are selectively transferred from the interline CCD to either of second and third CCDs.

DESCRIPTION OF THE PREFERRED EMBODIMENT

Figure 1:
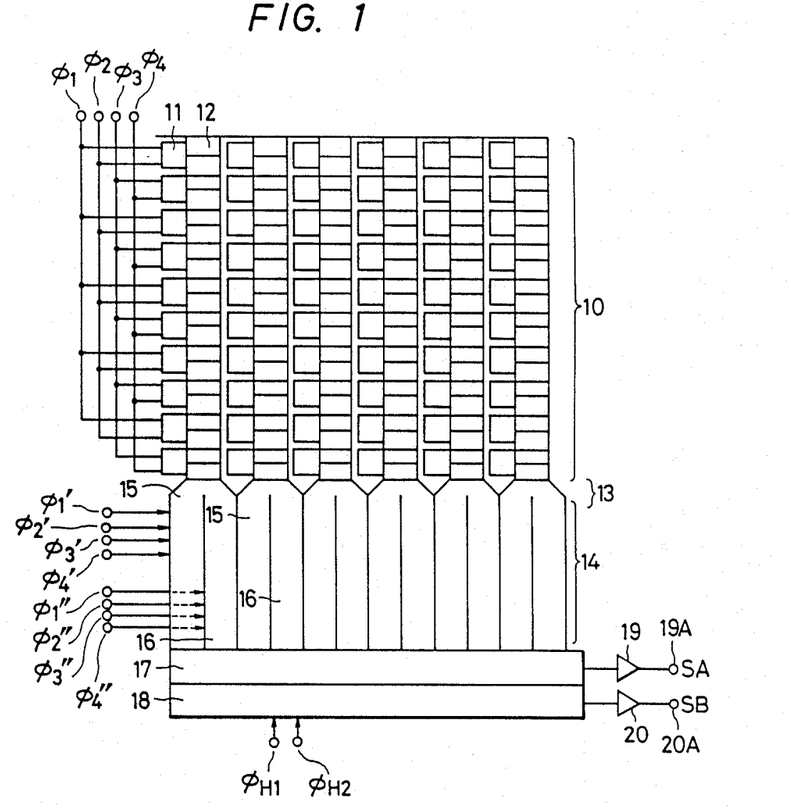
FIG. 1 is a diagram of a solid-state imaging apparatus according to an embodiment of this invention.

With reference to FIG. 1, a solid-state imaging apparatus includes an image pickup section 10 having a matrix array of photodiodes 11. The image pickup section 10 also has first vertical (interline transfer) CCDs 12 corresponding to respective adjacent vertical lines of the photodiodes 11. Each first vertical CCD is composed of a series combination of two-stage segments or cells. In each pair of corresponding vertical lines of photodiodes 11 and CCD 12, the photodiodes 11 and the CCD segments form sets having respective transfer gates via which the photodiodes 11 and the CCD segments are connected. These sets are arranged in a matrix corresponding to the array of photodiodes 11. Each set includes two control terminals. First control terminals of the sets in odd horizontal lines are connected in common to a clock input terminal $\phi 1$. Second control terminals of the sets in odd horizontal lines are connected in common to a clock input terminal $\phi 2$. First control terminals of the sets in even horizontal lines are connected in common to a clock input terminal $\phi 3$. Second control terminals of the sets in even horizontal lines are connected in common to a clock input terminal $\phi 4$.

Figure 2:
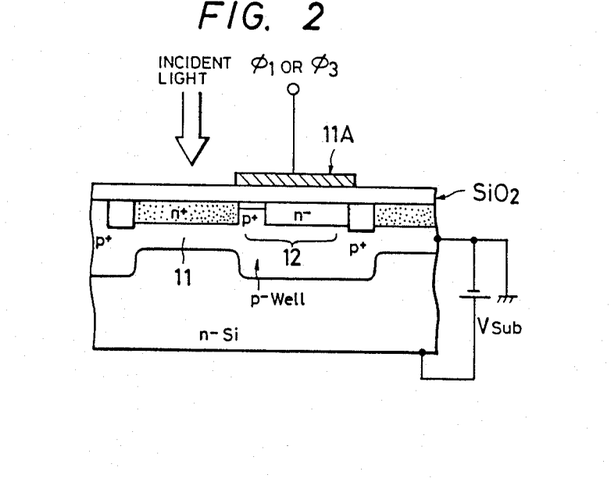
FIG. 2 is a sectional view of part of the image pickup section of the imaging apparatus in FIG. 1.

FIG. 2 shows one set of the photodiode 11, the CCD segment, and the transfer gate. As shown in FIG. 2, an electrode 11A of the transfer gate is connected to the clock input terminal $\phi 1$ or $\phi 3$. When the transfer gate electrode 11A is subjected to a high level pulse, charges are transferred from the photodiode 11 to the segment of CCD 12. When the transfer gate electrode 11A is subjected to a low level pulse or an intermediate level pulse, charges are transferred from the CCD segment to the following CCD segment.

As shown in FIG. 1, a storage or memory section 14 includes second vertical CCDs 15 and third vertical CCDs 16 corresponding to the respective first vertical CCDs 12. The second vertical CCDs 15 alternate with the third vertical CCDs 16. Each first vertical CCD 12 is connected to a corresponding pair of a second vertical CCD 15 and a third vertical CCD 16 via a switch 13, which allows charges to be selectively transferred from the first vertical CCD 12 to the second vertical CCD 15 or the third vertical CCD 16. Each of the second and third vertical CCDs 15 and 16 is composed of a series combination of four-phase segments or cells. The segments of the second vertical CCDs 15 are connected to clock input terminals $\phi1'$, $\phi2'$, $\phi3'$, and $\phi4'$. The segments of the third vertical CCDs 16 are connected to clock input terminals $\phi1''$, $\phi2''$, $\phi3''$, and $\phi4''$.

Figure 3:
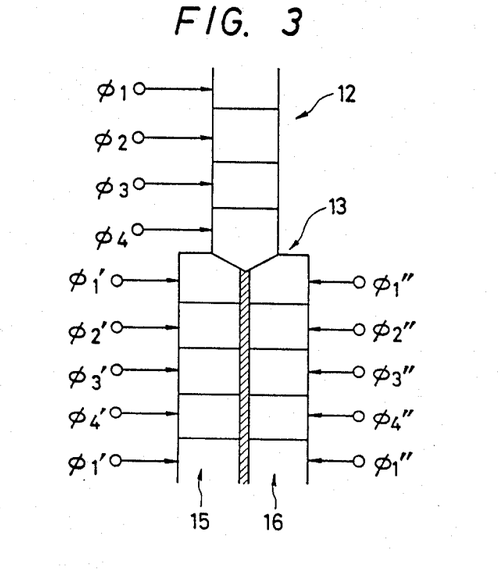
FIG. 3 is a diagram of the image pickup section, the memory section, and the switch between the image pickup section and the memory section in the imaging apparatus of FIG. 1.

As shown in FIG. 3, each switch 13 is formed by the lower end segment of the first vertical CCD 12 and the upper end segments of the second and third vertical CCDs 15 and 16. Specifically, the lower end segment of the first vertical CCD 12 has right-hand and left-hand bottom edges directly coupled to tops of the upper end segments of the second and third vertical CCDs 15 and 16 respectively. Accordingly, charges can travel from the lower end segment of the first vertical CCD 12 to either of the upper end segments of the second and third vertical CCDs 15 and 16. When the clock input terminal $\phi1''$ is subjected to a low potential, charge transfer from the first vertical CCDs 12 to the third vertical CCDs 16 is inhibited. When the clock input terminal $\phi1'$ is subjected to a low potential, charge transfer from the first vertical CCDs 12 to the second vertical CCDs 15 is inhibited.

A readout section includes first and second horizontal CCDs 17 and 18. The first horizontal CCD 17 is connected to the third vertical CCDs 16 in the memory section 14. The first horizontal CCD 17 is connected via a floating diffusion amplifier 19 to a first output terminal 19A. The second horizontal CCD 18 is connected to the second vertical CCDs 15 in the memory section 14. The second horizontal CCD 18 is connected via a floating diffusion amplifier 20 to a second output terminal 20A. The first horizontal CCD 17 and the second horizontal CCD 18 are connected to clock input terminals $\phi H1$ and $\phi H2$. When drive pulses are applied to the clock input terminals $\phi H1$ and $\phi H2$, the first horizontal CCD 17 and the second horizontal CCD 18 perform respective charge transfers.

Figure 4A:
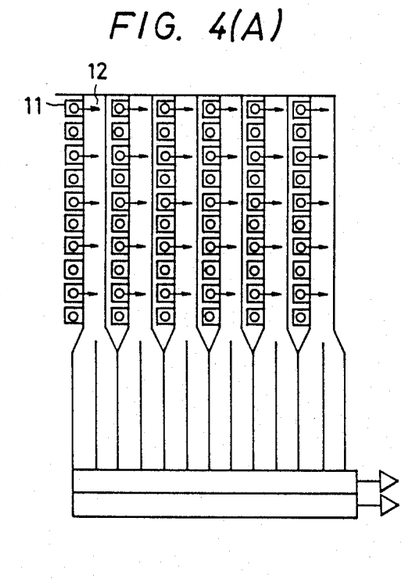
FIGS. 4(A)–4(F) are diagrams of the imaging apparatus of FIG. 1 at different operation phases or stages.
Figure 4B:
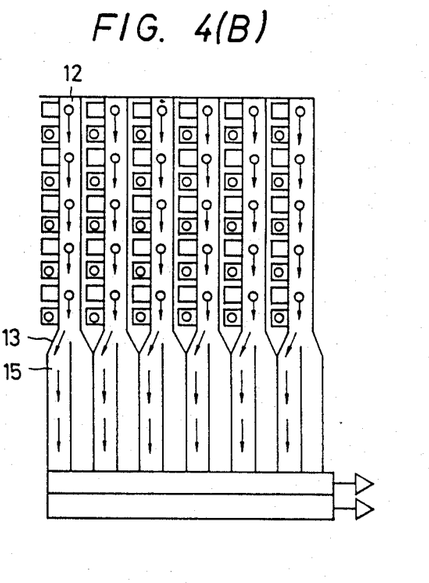
Figure 4C:
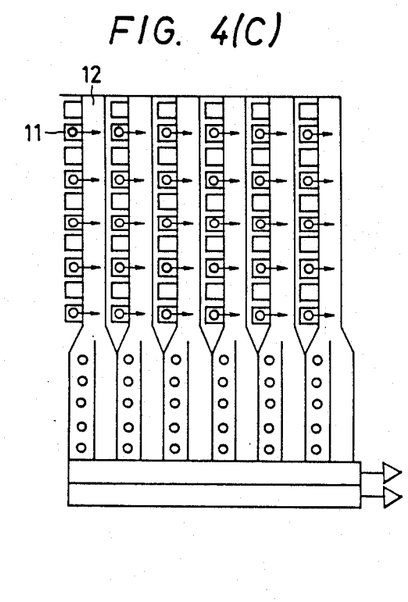
Figure 4D:
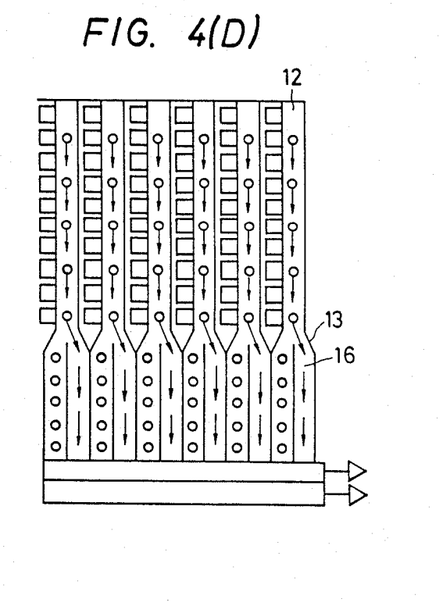

Operation of the solid-state imaging apparatus of FIGS. 1-3 during one field interval will be described hereinafter with reference to FIGS. 4(A)-4(F) and 12-14. It should be noted that in FIGS. 12-14, the characters $\phi1-\phi4$, $\phi1'-\phi4'$, $\phi1''-\phi4''$, $\phi H1$ and $\phi H2$ denote pulses applied to the terminals $\phi1-\phi4$, $\phi1'-\phi4'$, $\phi1''-\phi4''$, $\phi H1$ and $\phi H2$ respectively. The photodiodes 11 generate charges in accordance with incident lights. During a vertical blanking period, as shown in FIG. 4(A), charges are transferred from odd horizontal lines of the photodiodes 11 to the corresponding segments of the first vertical CCDs 12. The charge transfer from the odd horizontal lines of photodiodes 11 to the corresponding segments of the first vertical CCDs 12 is performed by application of a high level pulse to the clock input terminal $\phi1$ (see FIG. 12). Thereafter, as shown in FIG. 4(B), the switches 13 select the second vertical CCDs 15 so that the charges are transferred from the first vertical CCDs 12 to the second vertical CCDs 15. The charge transfer from the first vertical CCDs 12 to the second vertical CCDs 15 is performed by application of high-frequency low-level and intermediate-level pulses to the clock input terminals $\phi1-\phi4$ and $\phi1'-\phi4'$ (see FIGS. 12 and 13). When the charges are transferred from the first vertical CCDs 12 to the second vertical CCDs 15, the clock input terminal $\phi1''$ remains subjected to a low potential (see FIG. 12) so that charge transfer from the first vertical CCDs 12 to the third vertical CCDs 16 keeps inhibited. The frequency of pulses applied to the clock input terminals $\phi1-\phi4$ and $\phi1'-\phi4'$ determines the speed of the charge transfer from the first vertical CCDs 12 to the second vertical CCDs 15. The speed of the charge transfer from the first vertical CCDs 12 to the second vertical CCDs 15 is chosen to be sufficiently higher than a given speed determined by a horizontal scanning frequency. During a next interval in the vertical blanking period, as shown in FIG. 4(C), charges are transferred from even horizontal lines of the photodiodes 11 to the corresponding segments of the first vertical CCDs 12. The charge transfer from the even horizontal lines of photodiodes 11 to the corresponding segments of the first vertical CCDs 12 is performed by application of a high level pulse to the clock input terminal $\phi3$ (see FIG. 12). Thereafter, as shown in FIG. 4(D), the switches 13 select the third vertical CCDs 16 so that the charges are transferred from the first vertical CCDs 12 to the third vertical CCDs 16. The charge transfer from the first vertical CCDs 12 to the third vertical CCDs 16 is performed by application of high-frequency low-level and intermediate-level pulses to the clock input terminals $\phi1-\phi4$ and $\phi1''-\phi4''$ (see FIG. 12). When the charges are transferred from the first vertical CCDs 12 to the third vertical CCDs 16, the clock input terminal $\phi1'$ remains subjected to a low potential (see FIG. 12) so that charge transfer from the first vertical CCDs 12 to the second vertical CCDs 15 keeps inhibited. The frequency of pulses applied to the clock input terminals $\phi1-\phi4$ and $\phi1''-\phi4''$ determines the speed of the charge transfer from the first vertical CCDs 12 to the third vertical CCDs 16. The speed of the charge transfer from the first vertical CCDs 12 to the third vertical CCDs 16 is chosen to be sufficiently higher than the given speed determined by the horizontal scanning frequency. In this way, the charges generated in the photodiodes 11 in the odd horizontal lines are transferred to and stored in the second vertical CCDs 15. The charges generated in the photodiodes 11 in the even horizontal lines are transferred to and stored in the third vertical CCDs 16.

Figure 4E:
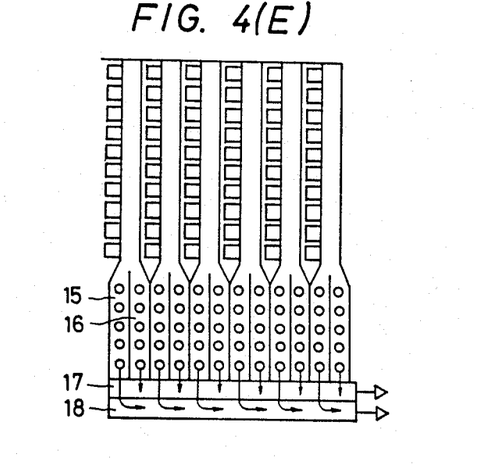
Figure 4F:
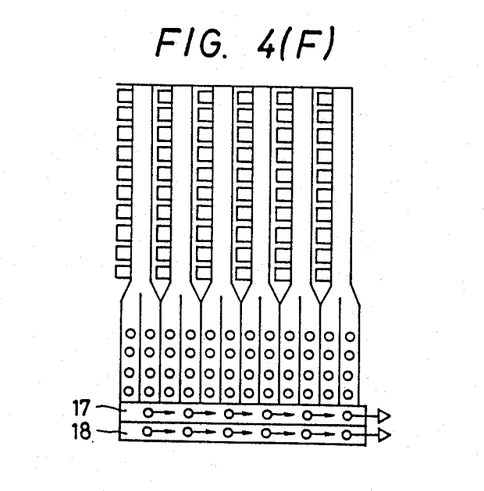
Figure 14:
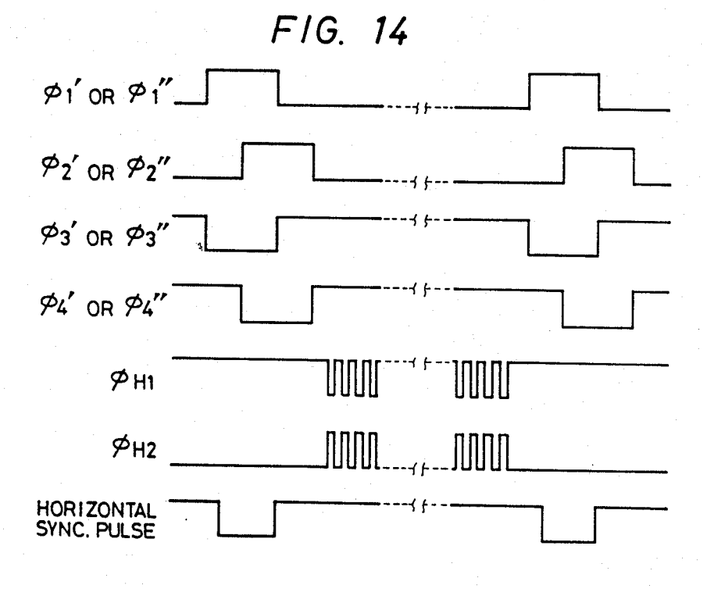
FIG. 14 is an enlarged view of the portion B of FIG. 12.

During horizontal blanking periods after the vertical blanking period, the second and third vertical CCDs 15 and 16 are cyclically driven at a low speed corresponding to the horizontal scanning frequency, e.g., 15.7 KHz. The drive of the second and third vertical CCDs 15 and 16 is performed by exposure of the clock input terminals $\phi1'-\phi4'$ and $\phi1''-\phi4''$ to pulses having a frequency corresponding to the horizontal scanning frequency (see FIGS. 12 and 14). As shown in FIG. 4(E), the cyclic drive of the second vertical CCDs 15 successively transfers the charges from the second vertical CCDs 15 to the second horizontal CCD 18. Specifically, in one cycle of the drive of the second vertical CCDs 15, a group of charges generated by the photodiodes 11 in a horizontal line are simultaneously transmitted from the second vertical CCDs 15 to the second horizontal CCD 18. Similarly, the cyclic drive of the third vertical CCDs 16 successively transfers the charges from the third vertical CCDs 16 to the first horizontal CCD 17. Specifically, in one cycle of the drive of the third vertical CCDs 16, a group of charges generated by the photodiodes 11 in a horizontal line are simultaneously transmitted from the third vertical CCDs 16 to the first horizontal CCD 17. As shown in FIG. 4(F), the charges are transferred from the first and second horizontal CCDs 17 and 18 to the amplifiers 19 and 20 respectively at a high speed determined by a horizontal sampling frequency fs. The charge transfer from the first and second horizontal CCDs 17 and 18 to the amplifiers 19 and 20 are performed by exposure of the clock input terminals $\phi H1$ and $\phi H2$ to pulses having a high frequency corresponding to the horizontal sampling frequency fs (see FIG. 14). Each time one cycle of the drive of the second and third vertical CCDs 15 and 16 is completed, the charge transfers from the first and second horizontal CCDs 17 and 18 to the amplifiers 19 and 20 are executed. The amplifiers 19 and 20 derive independent picture or video signals SA and SB from the respective inputted charges. These video signals SA and SB are transmitted via the output terminals 19A and 20A respectively.

It should be noted that pulses applied to the terminal $\phi 1'$ are similar to pulses applied to the terminal $\phi 1''$ but different in phase from pulses applied to the terminal $\phi 1'''$. Pulses applied to the terminal $\phi 2'$ are similar to pulses applied to the terminal $\phi 2''$ but different in phase from pulses applied to the terminal $\phi 2'''$. Pulses applied to the terminal $\phi 3'$ are similar to pulses applied to the terminal $\phi 3''$ but different in phase from pulses applied to the terminal $\phi 3'''$. Pulses applied to the terminal $\phi 4'$ are similar to pulses applied to the terminal $\phi 4''$ but different in phase from pulses applied to the terminal $\phi 4'''$.

Figure 5:
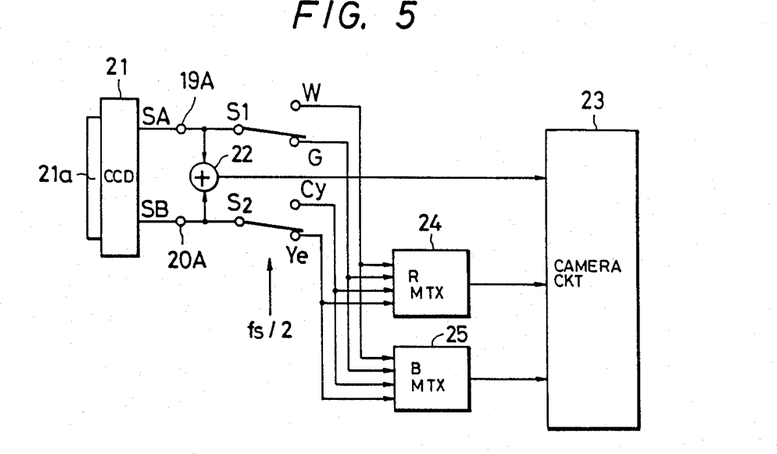
FIG. 5 is a block diagram of a color television camera including the imaging apparatus of FIGS. 1–3.

FIG. 5 shows a color television camera including the imaging apparatus of FIGS. 1–3 which is denoted by the reference numeral 21. The imaging apparatus 21 is provided with a color filter arrangement 21a.

Figure 6:
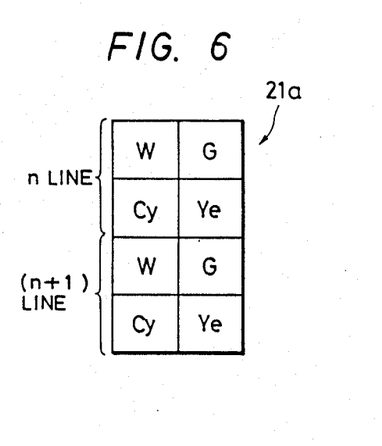
FIG. 6 is a diagram of the color filter arrangement in FIG. 5.

As shown in FIG. 6, the color filter arrangement 21a includes a matrix array of filter elements corresponding to the respective photodiodes 11 (see FIG. 1). Specifically, the color filter arrangement 21a has recurrent patterns of four color filter elements "W" (transparent), "G" (green), "Cy" (cyan), and "Ye" (yellow) having cycles of two picture elements in vertical and horizontal lines. In the case of corresponding signals, the characters "W", "G", "Cy", and "Ye" denote white, green, cyan, and yellow signals respectively.

The output signal SA from the imaging apparatus 21 alternates between the "W" signal and the "G" signal at a frequency equal to a half of the horizontal sampling frequency fs. The other output signal SB from the imaging apparatus 21 alternates between the "Cy" signal and the "Ye" signal at a frequency equal to a half of the horizontal sampling frequency fs. The output terminals 19A and 20A of the imaging apparatus 21 are connected to respective input terminals of an adder 22. The output signals SA and SB from the imaging apparatus 21 are added by the device 22 to form a brightness signal, which is applied to a camera circuit 23.

The output signals SA and SB from the imaging apparatus 21 are applied to switches S1 and S2 respectively. The switches S1 and S2 are driven by signals having a frequency equal to a half of the horizontal sampling frequency fs so that they are switched at the frequency fs/2. The switch S1 separates "W" signal components and "G" signal components and thus derives the "W" signal and the "G" signal from the signal SA outputted by the imaging apparatus 21. The switch S2 separates "Cy" signal components and "Ye" signal components and thus derives the "Cy" signal and the "Ye" signal from the signal SB outputted by the imaging apparatus 21.

The "W" signal, the "G" signal, the "Cy" signal, and the "Ye" signal are applied to an "R" matrix circuit 24 and a "B" matrix circuit 25. The characters "R" and "B" denote red and blue signals respectively. The "R" matrix circuit 24 derives the "R" signal from the four color signals. The "B" matrix circuit 25 derives the "B" signal from the four color signals. The "R" signal and the "B" signal are applied to the camera circuit 23. The camera circuit 23 generates a composite NTSC video signal in accordance with the brightness signal, the "R" signal, and the "B" signal.

Since the color filter arrangement 21a has the periods of two picture elements in vertical and horizontal lines as described previously, an "R" signal and a "B" signal are produced simultaneously in each line so that phantom color signals within the NTSC signal transmission band are securely prevented from appearing at vertical edge lines of an image. The maximum quantity of transfer charges per unit or stage of the first vertical CCDs 12 can be equal to a half of the maximum quantity of transfer charges in frame storage and field storage of conventional interline transfer CCDs. Accordingly, the areas of the photodiodes 11 can be made large relative to other areas on the CCD image sensor and thus the sensitivity of the imaging apparatus can be high. Since the image pickup section 10 and the memory section 14 are separate and the charges are transferred along the first vertical CCDs 12 at a high speed, a time during which light passes through regions around the photodiodes 11 can be short and thus the smear can be reduced to a low level.

Figure 7:
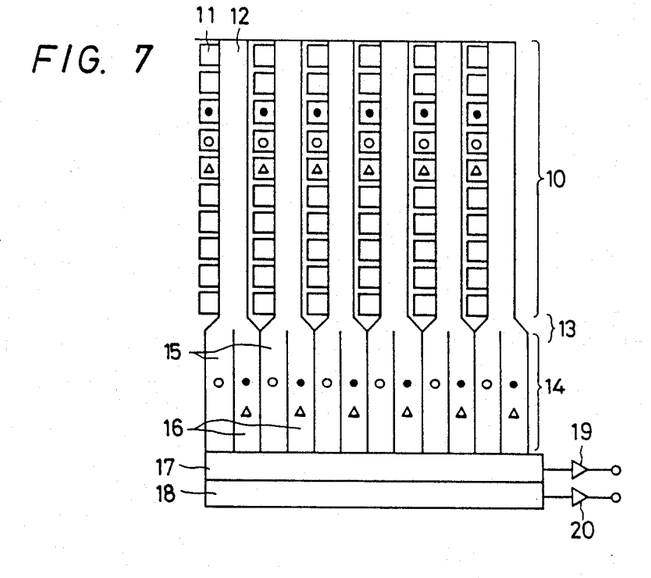
FIG. 7 is a diagram of the imaging apparatus of FIGS. 1–3 during an odd field.
Figure 8:
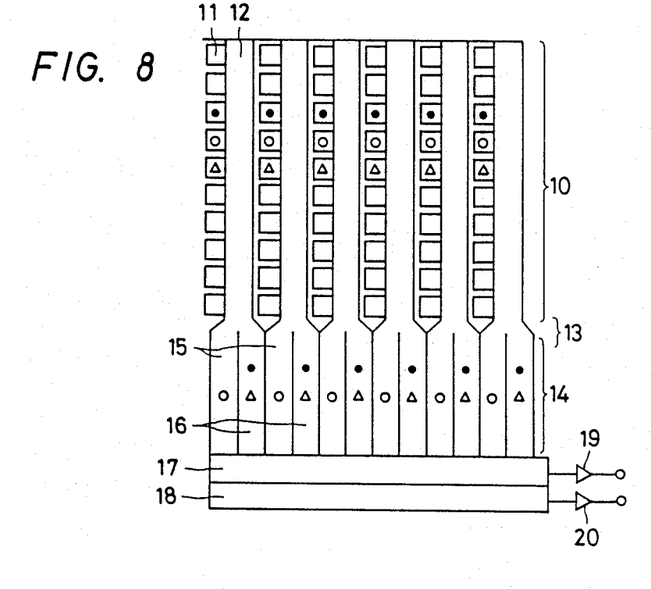
FIG. 8 is a diagram of the imaging apparatus of FIGS. 1–3 during an even field.

Interlaced scanning will be described in the following. FIG. 7 shows an internal state of the imaging apparatus during an odd field. FIG. 8 shows an internal state of the imaging apparatus during an even field. As shown in FIGS. 7 and 8, each horizontal row of stored charges in the memory section 14 contains charges from 2 adjacent rows of the photodiodes 11 to form one of 525 scanning lines. These charges corresponding to 2 adjacent rows of the photodiodes 11 are transformed into video signals SA and SB outputted via the amplifiers 19 and 20 simultaneously. A brightness signal is composed by adding the two video signals SA and SB. As shown in FIGS. 7 and 8, the third vertical CCDs 16 hold 2 out of 3 charges derived respectively from the 3 vertically consecutive photodiodes, and between odd and even fields, a charge transferring increment is differentiated or shifted, by one step advanced or retarded with respect to charges in the second vertical CCDs 16. By these structure and process, the interlaced scanning is performed.

Figure 9:
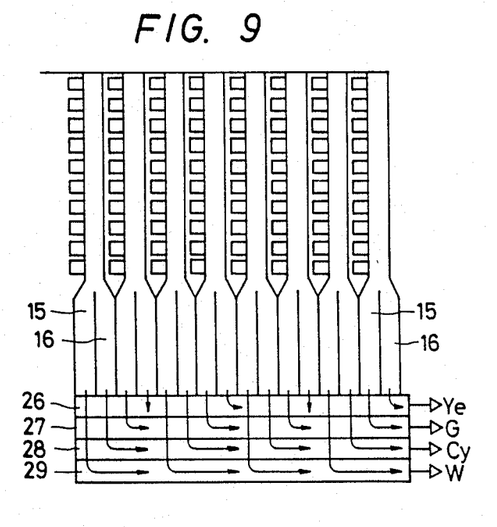
FIG. 9 is a diagram of a solid-state imaging apparatus according to a first modification of the embodiment of this invention.

FIG. 9 shows a first modification of the imaging apparatus. In this modification, the two horizontal CCDs 17 and 18 (see FIG. 1) are replaced by four horizontal CCDs 26, 27, 28, and 29. The first horizontal CCD 26 is connected to vertical CCDs 16 at the even ordinal numbered positions counted from the left. The second horizontal CCD 27 is connected to second vertical CCDs 15 at the even ordinal numbered positions counted from the left. The third horizontal CCD 28 is connected to third vertical CCDs 16 at the odd ordinal numbered positions counted from the left. The fourth horizontal CCD 29 is connected to second vertical CCDs 15 at the odd ordinal numbered positions counted from the left. A "Ye" signal, a "G" signal, a "Cy" signal, and a "W" signal are generated via the four horizontal CCDs 26, 27, 28, and 29 respectively. This modification allows the switches S1 and S2 (see FIG. 5) to be omitted.

Figure 10:
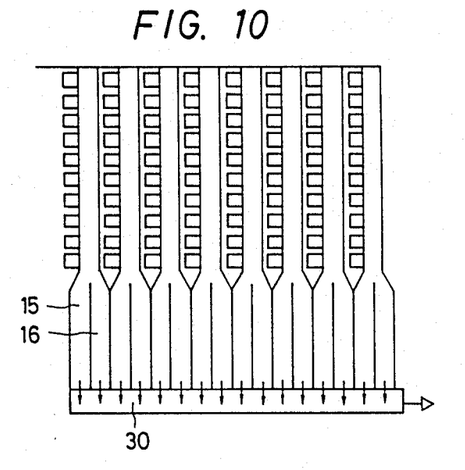
FIG. 10 is a diagram of a solid-state imaging apparatus according to a second modification of the embodiment of this invention.

FIG. 10 shows a second modification of the imaging apparatus. In this modification, the two horizontal CCDs 17 and 18 (see FIG. 1) are replaced by a single horizontal CCD 30. A "Ye" signal, a "G" signal, a "Cy" signal, and a "W" signal are derived from the output signal of the horizontal CCD 30 by a four-state switch or four-channel demultiplexer.

Figure 11:
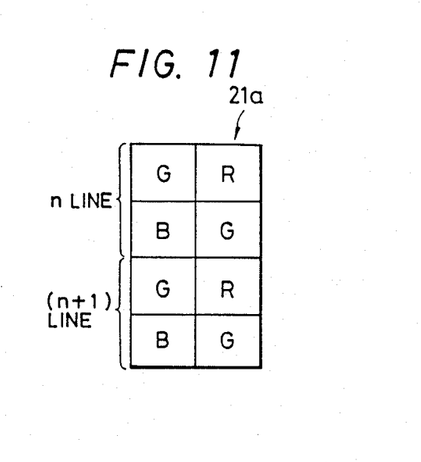
FIG. 11 is a diagram of another color filter arrangement.
Figure 12:
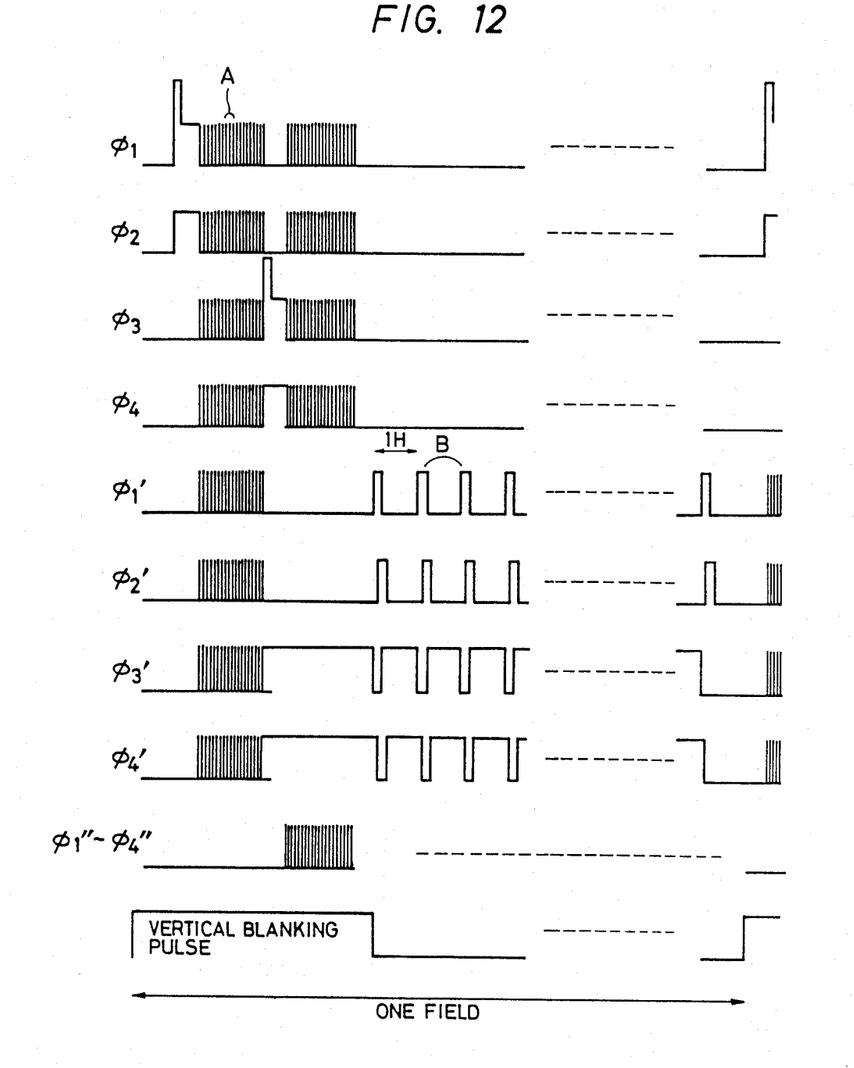
FIG. 12 is a timing diagram of pulses applied to the imaging apparatus of FIGS. 1–3.
Figure 13:
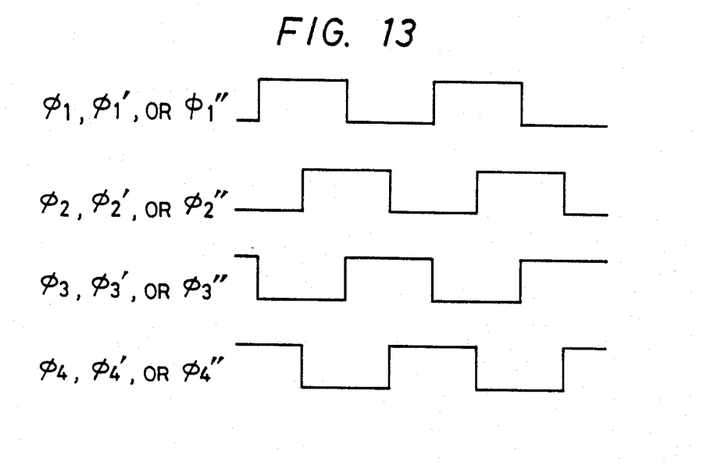
FIG. 13 is an enlarged view of the portion A of FIG. 12.

The color filter arrangement 21a may be of design as shown in FIG. 11. The color filter arrangement 21a of FIG. 11 includes recurrent patterns of three primary color filter elements "G", "R", and "B". This color filter arrangement 21a allows the "R" matrix circuit 24 and the "B" matrix circuit 25 (see FIG. 5) to be omitted.

What is claimed is:

1. A solid-state imaging apparatus comprising:
   (a) an image pickup section including an interline transfer CCD and a color filter arrangement having a period of two picture elements in horizontal and vertical directions, the image pickup section generating charges in accordance with incident lights;
   (b) a storage section including first and second CCDs;
   (c) a switch arrangement selectively transferring the charges from the image pickup section to either of the first and second CCDs in the storage section; and
   (d) a readout section including at least one CCD and reading out the charges from the storage section;
   wherein during a vertical blanking period, picture element signals corresponding to odd lines are outputted from the image pickup section and are transferred to the first CCD in the storage section, and then picture element signals corresponding to even lines are outputted from the image pickup section and are transferred to the second CCD in the storage section; and
   wherein during a horizontal blanking period after the vertical blanking period, the readout section independently reads out the picture element signals from the first and second CCDs in the storage section.

2. The imaging apparatus of claim 1 wherein the readout section comprises a first horizontal CCD reading out the picture element signals corresponding to the odd lines, a second horizontal CCD reading out the picture element signals corresponding to the even lines, a first switch switching output of the first horizontal CCD and thereby deriving a first group of picture element signals and a second group of picture element signals from the output of the first horizontal CCD, the first group of picture element signals being independent of the second group of picture element signals, and a second switch switching output of the second horizontal CCD and thereby deriving a third group of picture element signals and a fourth group of picture element signals from the output of the second horizontal CCD, the third group of picture element signals being independent of the fourth group of picture element signals.

3. The imaging apparatus of claim 1 wherein the readout section comprises first and second horizontal CCDs reading out the respective picture element signals corresponding to the odd lines along a horizontal direction, and third and fourth horizontal CCDs reading out the respective picture element signals corresponding to the even lines along the horizontal direction.

4. A solid-state imaging apparatus comprising:
   (a) an image sensor including photosensitive elements and an interline transfer CCD, the photosensitive elements generating charges in accordance with incident lights, the interline transfer CCD storing the charges generated by the photosensitive elements;
   (b) second and third separate CCDs;
   (c) means for selectively transferring the charges from the interline transfer CCD to either of the second and third separate CCDs;
   (d) means for transferring the charges from a first group of the photosensitive elements to the interline transfer CCD during a first period;
   (e) means for allowing the selectively-transferring means to transfer the charges from the interline transfer CCD to the second separate CCD during a second period following the first period;
   (f) means for transferring the charges from a second group of the photosensitive elements to the interline transfer CCD during a third period following the second period; and
   (g) means for allowing the selectively-transferring means to transfer the charges from the interline transfer CCD to the third separate CCD during a fourth period following the third period.

* * * * *